United States Patent
Gealow et al.

(10) Patent No.: US 6,950,672 B2
(45) Date of Patent: Sep. 27, 2005

(54) CLOCK ENABLE SYSTEM

(75) Inventors: Jeffrey C. Gealow, Andover, MA (US); Thomas J. Barber, Jr., Medford, MA (US); Palle Birk, Gistrup (DK); Joern Soerensen, Aars (DK)

(73) Assignee: Analog Devices, Inc., Norwood, MA (US)

( * ) Notice: Subject to any disclaimer, the term of this patent is extended or adjusted under 35 U.S.C. 154(b) by 86 days.

(21) Appl. No.: 10/159,177

(22) Filed: May 30, 2002

(65) Prior Publication Data

US 2003/0224745 A1 Dec. 4, 2003

(51) Int. Cl.[7] .............................................. H04B 1/38
(52) U.S. Cl. ................... 455/550.1; 455/574; 327/291; 327/144
(58) Field of Search ........................... 455/181.1, 574, 455/343.4, 575.1, 183.2, 550.1, 407, 260, 334, 95, 127.1, 231, 556.1, 333, 265, 255, 343.1, 424, 425, 561, 456.5, 456.6; 713/500, 322, 300, 320, 324, 600, 501, 321; 375/316, 376, 219, 214; 327/99, 544, 398, 165, 211, 291, 295, 112, 415, 108, 213, 141, 144, 176, 233, 298; 326/93, 82, 83, 85, 21–28, 86, 87, 95

(56) References Cited

U.S. PATENT DOCUMENTS

| | | | | |
|---|---|---|---|---|
| 5,058,203 | A | * 10/1991 | Inagami | ........................ 455/89 |
| 5,485,127 | A | * 1/1996 | Bertoluzzi et al. | ............ 331/69 |
| 5,675,808 | A | 10/1997 | Gulick et al. | |
| 5,677,849 | A | * 10/1997 | Smith | .......................... 713/300 |
| 5,950,120 | A | * 9/1999 | Gardner et al. | .............. 455/343 |
| 6,125,451 | A | * 9/2000 | Fukunaga | ..................... 713/500 |
| 6,442,407 | B1 | * 8/2002 | Bauer et al. | ................. 455/574 |
| 6,564,329 | B1 | * 5/2003 | Cheung et al. | ............. 731/322 |
| 2003/0014682 | A1 | * 1/2003 | Schmidt | ...................... 713/500 |

* cited by examiner

*Primary Examiner*—Edward F. Urban
*Assistant Examiner*—Charles Chow
(74) *Attorney, Agent, or Firm*—Iandiorio & Teska

(57) ABSTRACT

A clock enable system for a multichip device includes a first integrated circuit including a clock signal and at least a second integrated circuit including at least one functional block periodically requiring clock signals from the first integrated circuit; a clock required circuit responsive to each functional block for providing a clock required signal in response to activation of any one or more of the functional blocks; and a clock enable circuit responsive to the clock required signal for enabling the first integrated circuit to provide clock signals to the functional blocks on the second integrated circuit.

7 Claims, 2 Drawing Sheets

US 6,950,672 B2

CLOCK ENABLE SYSTEM

FIELD OF THE INVENTION

This invention relates to an improved clock enable system, and more particularly to such a system which minimizes supply current by limiting the activity of clock signals transmitted between integrated circuits.

BACKGROUND OF THE INVENTION

In systems that use clock signals produced by one integrated circuit to serve a second integrated circuit, supply current is unnecessarily high when active clock signals are transmitted to the second integrated circuit during intervals when the circuits on the second integrated circuit do not require an active clock signal. For example, in many GSM mobile station designs, a master clock produced by a digital baseband processor (DBB) serves functional blocks on the analog baseband processor (ABB). The master clock could be kept continuously active but this would be quite inefficient. When no ABB circuits require an active master clock signal, the master clock signal should be disabled to minimize supply current. One approach is to disable the clock signal within the ABB using well-known clock-gating techniques. This approach is not very effective because it does not limit the activity of the clock signal transmitted from the DBB to the ABB. Supply current is required to charge and discharge the capacitance of the line carrying the clock signal from the DBB to the ABB. The clock signal cannot be effectively controlled using DBB software because the DBB is a multitasking, multiprocessor device that may not be able to respond quickly when the clock signal is not needed by the ABB. Clock activity could be controlled using dedicated timing circuits, tailored to the ABB, on the DBB but this would be inflexible and would require additional circuitry.

BRIEF SUMMARY OF THE INVENTION

It is therefore an object of this invention to provide an improved clock enable system.

It is a further object of this invention to provide such an improved clock enable system which conserves energy by controlling the activity of clock signals.

It is a further object of this invention to provide such an improved clock enable system which conserves energy by maintaining active clock signals only when circuits require active clock signals.

It is a further object of this invention to provide such an improved clock enable system which conserves energy by preventing transmission of active clock signals from an integrated circuit that produces clock signals to a second integrated circuit that uses clock signals except when the clock signals are required by the second integrated circuit.

It is a further object of this invention to provide such an improved clock enable system which reduces energy loss due to capacitance on interconnect lines that carry clock signals between integrated circuits.

The invention results from the realization that a truly simple and effective clock enable system for conserving energy in multichip environments can be achieved by monitoring the condition of the functional blocks on one integrated circuit served by clock signals from a clock driver on another integrated circuit and enabling transmission of those clock signals to the chip with the functional blocks only when one or more of the functional blocks is in an active condition requiring active clock signals.

This invention features a clock enable system for a multichip device including a first integrated circuit including a clock signal and at least a second integrated circuit including at least one functional block requiring clock signals. There is a clock required circuit responsive to each functional block for providing a clock required signal in response to activation of any one or more of the functional blocks. A clock enable circuit responsive to the clock required signal enables the first integrated circuit to provide clock signals to the functional blocks on the second chip.

In a preferred embodiment the clock request circuit may be on the second integrated circuit, the clock enable circuit may be on the first integrated circuit.

The invention also features a clock enable system for a multichip cellular terminal for enabling a digital baseband processor integrated circuit including a clock signal and an analog baseband processor integrated circuit including at least one functional block periodically requiring clock signals from the digital baseband processor integrated circuit. A clock required circuit responsive to each functional block provides a clock required signal in response to activation of any one or more of the functional blocks. A clock enable circuit responsive to the clock required signal enables the digital baseband processor integrated circuit to provide clock signals to the functional blocks on the analog baseband processor integrated circuit.

In a preferred embodiment the clock required circuit may be on the the analog baseband processor integrated circuit. The clock enable circuit may be on the digital baseband processor integrated circuit. The analog baseband processor integrated circuit mixed signal device may include an RF coder/decoder and a voiceband coder/decoder.

BRIEF DESCRIPTION OF THE DRAWINGS

Other objects, features and advantages will occur to those skilled in the art from the following description of a preferred embodiment and the accompanying drawings, in which.

PREFERRED EMBODIMENT

Figure 1:
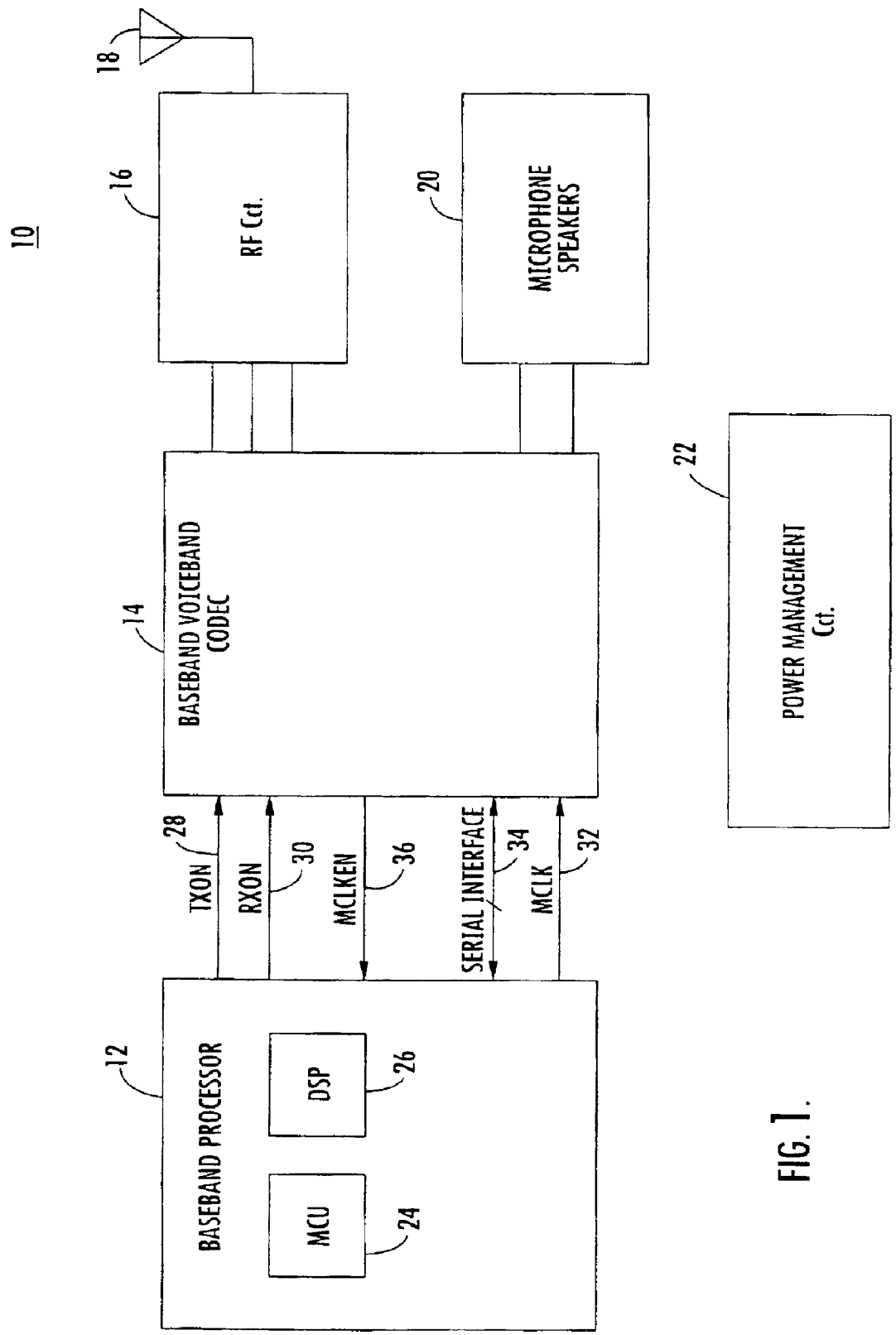
FIG. 1 is a schematic block diagram of a GSM mobile station employing the clock enable system according to this invention.

There is shown in FIG. 1 the primary electronic components of a GSM mobile station 10, a multichip device including digital baseband (DBB) integrated circuit processor 12 and an analog baseband (ABB) integrated circuit processor 14. ABB 14 may for example, include, as shown, a voiceband coder/decoder (codec) 13 and a radio frequency (RF) codec 15. GSM mobile station 10 also includes a radio circuit 16 with antenna 18 and an audio circuit 20 including a microphone and speaker. A power management circuit 22 provides power supplies for the other components.

Radio circuit 16 receives an RF signal transmitted by a base station using antenna 18 and produces corresponding baseband signals. RF codec 15 converts the analog baseband signals to a digital signal. The digital signal analyzed by DBB 12 demodulates the digital baseband signal produced by ABB 14, reproducing digital data sent by the base station.

DBB 12 decodes digital voice data and provides digital voiceband signals to ABB 14. ABB 14 voiceband codec 13 converts the digital voiceband signals to analog signals and uses the analog signals to drive the speaker.

ABB 14 amplifies analog voiceband signals from the microphone. ABB14 voiceband codec 13 converts the analog signals to digital signals. DBB 12 encodes digital voiceband signals to produce digital data for transmission to the base station.

DBB 12 provides digital data to ABB 14 RF codec 15. RF codec 15 modulates the digital data to produce a digital signal and converts the digital signal to an analog signal. The analog baseband signal is provided to radio 16. Radio 16 uses the analog baseband signal to produce an RF signal and transmits the RF signal to the base station using antenna 18.

DBB 12 typically includes a microcontroller 24 and a digital signal processor 26, among other things. DBB 12 also controls the interface with the user including keyboards, displays and the like. ABB 14 includes all of the analog to digital and digital to analog converters (ADCs and DACs) for the operation of mobile station 10 including the ADC that converts an analog signal received using RF circuit 16 to digital form and the DAC that converts a digital signal to analog form for transmission using radio circuit 16.

The TXON line 28 and RXON line 30 control the transmission and reception, respectively, of the signals between DBB 12 and radio circuit 16 through ABB 14. The MCLK clock signal on line 32 provides the clock signals to operate converters and other circuits in ABB 14. Serial interface line 34 conducts three types of serial interface signals between DBB 12 and ABB 14: audio signals between DBB and ultimately audio circuit 20; signals between DBB, ultimately radio circuit 16; and the control signals to read and write control registers in ABB 14.

Figure 2:
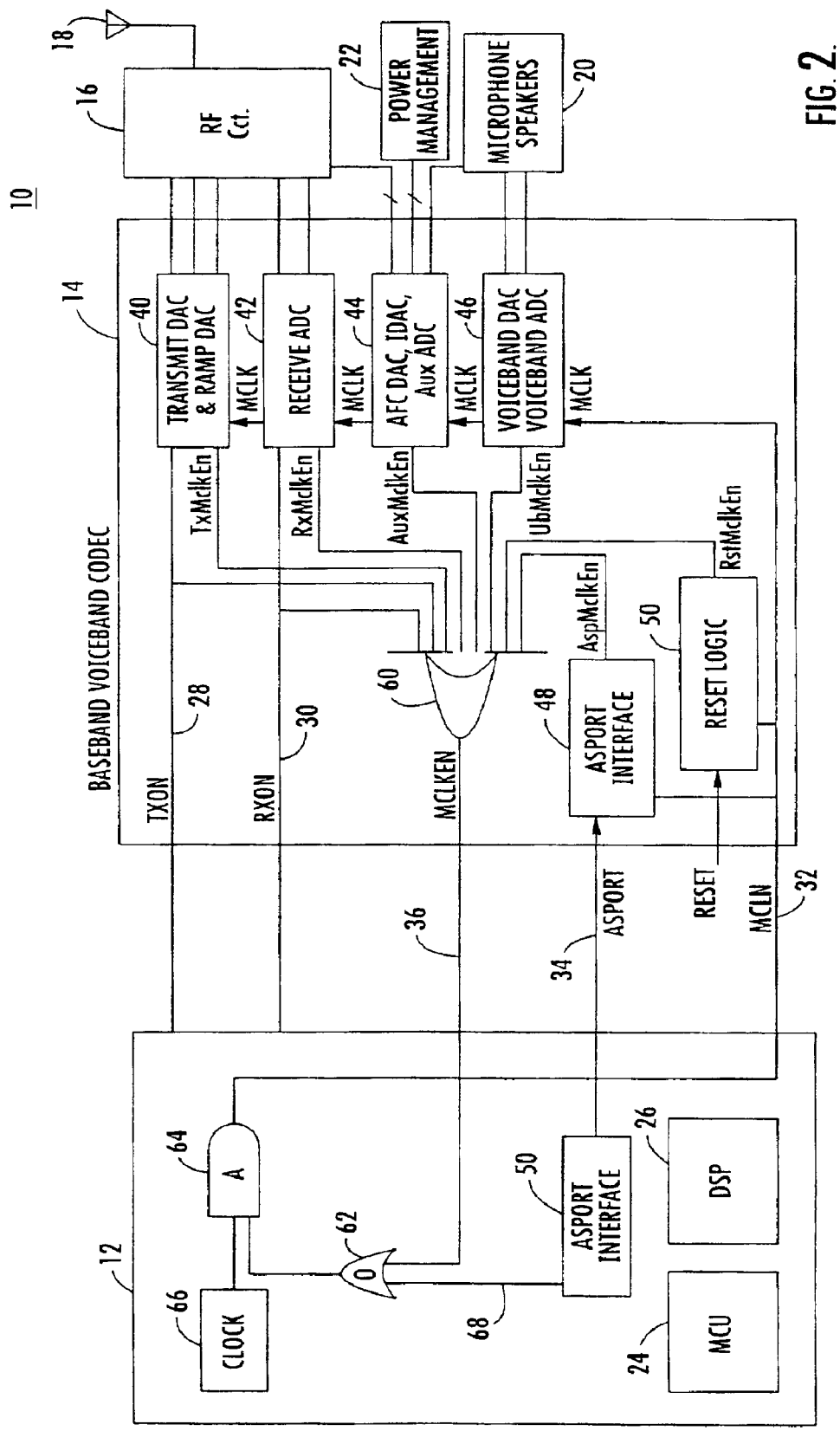
FIG. 2 is a more detailed diagram of a mobile station and improved clock enable system according to this invention.
Figure 1:
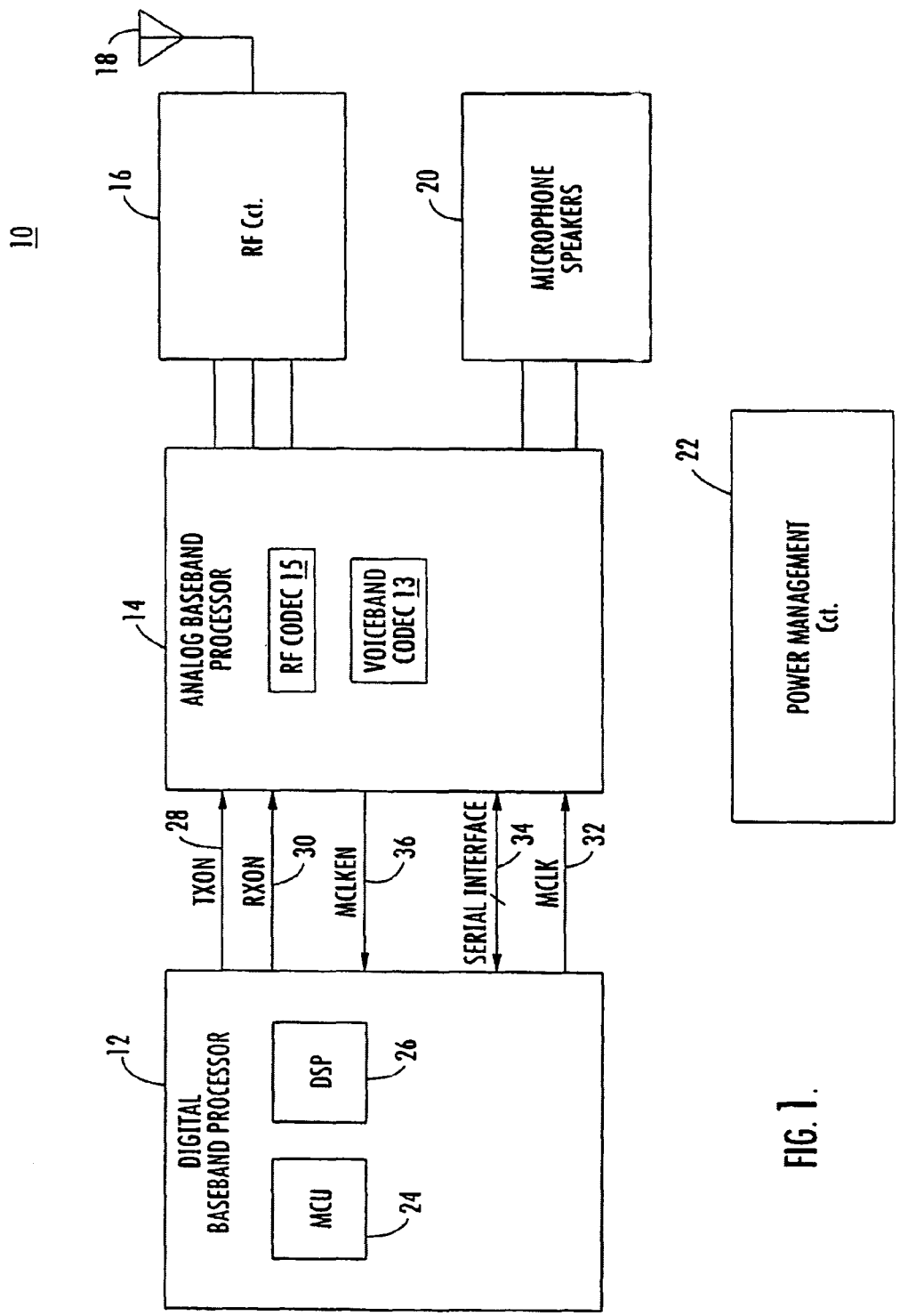
Figure 2:
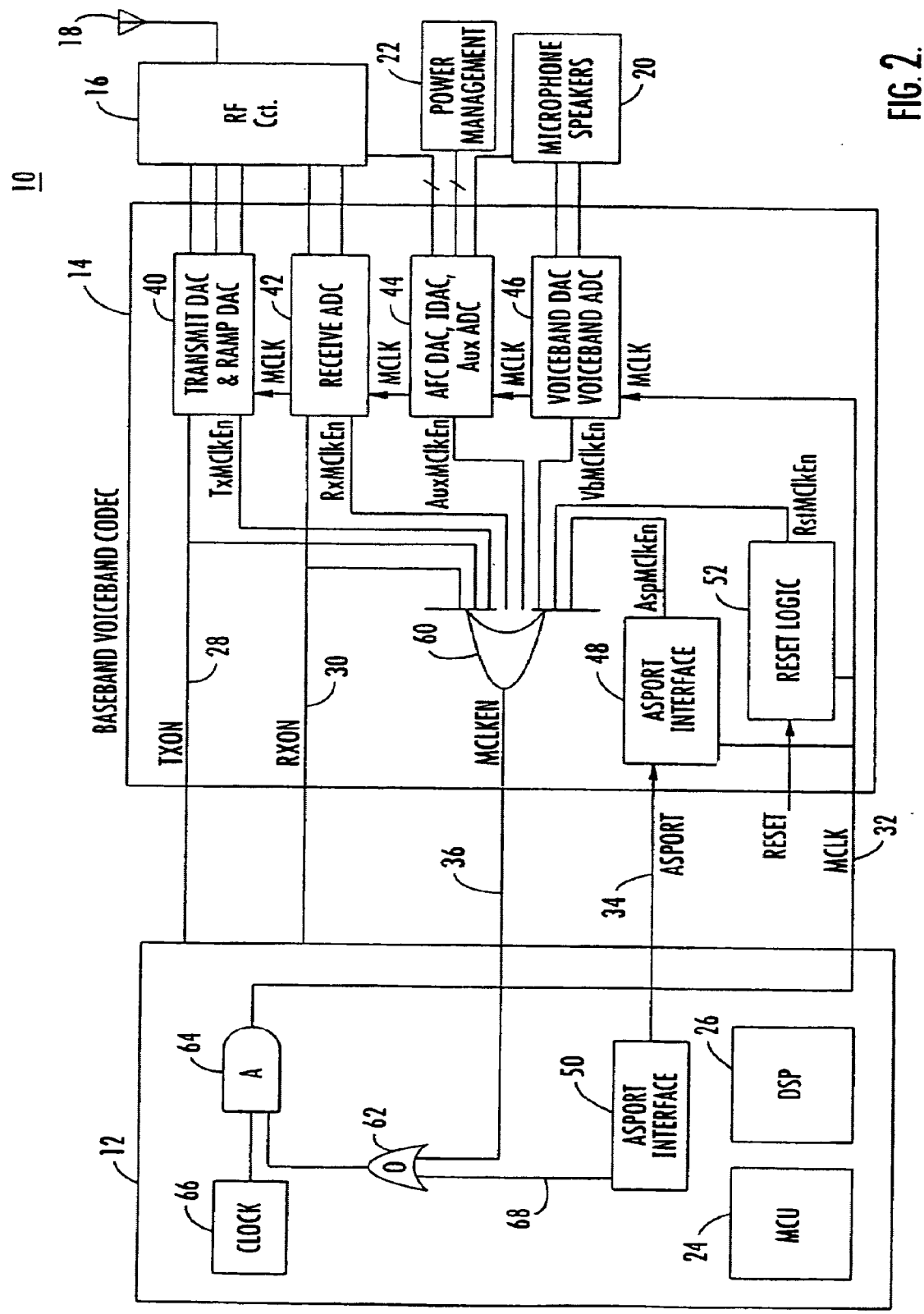

Unique to systems of this invention is MCLKEN line 36 which provides an enabling signal to the clock driver in DBB 12 when one or more of the functional blocks in ABB 14 requires an active MCLK signal on line 32. ABB 14 includes a number of functional blocks. The transmit DAC and ramp DAC 40, FIG. 2, are activated by signal TXON on line 28 to transmit input to RF circuit 16. The transmit DAC and ramp DAC provide an output signal TxMClkEn. Functional block 42 includes a receive ADC activated by signal RXON signal on line 30 to receive the signals from radio circuit 16. Functional block 42 in return provides an output signal of RxMClkEn. Functional block 44 includes an automatic frequency control DAC, a current output DAC and an auxiliary ADC, among other circuits and provides an output signal AuxMClkEn signal. Functional block 46 includes the voiceband ADC and voiceband DAC for exchanging signals with the microphone and speakers in audio circuit 20. It provides the output signal VbMClkEn. The functional block 48 ASPORT interface receives data from and transmits data to the ASPORT interface 50 in DBB 12 using a group of signals 34. The ASPORT interface provides an output signal AspMClkEn. Functional block 52 (reset logic) responds to a reset signal and an MCLK signal on line 32 to provide an output signal RstMClkEn. Each of these signals from functional blocks 40, 42, 44, 46, 48 and 52 is provided to the clock required circuit, OR gate 60, whose output MCLKEN on line 36 is delivered to the clock enable circuit, OR gate 62, in DBB 12. OR gate 62 also receives the signal from the DBB 12 ASPORT interface 50. The output of OR gate 62 actuates AND gate 64 to pass clock signals from clock 66 over MCLK line 32 to operate the various functional blocks in ABB 14.

In operation, the activation of any one of the functional blocks 40, 42, 44, 46, 48 and 52 will produce the respective signal TxMClkEn, RxMClkEn, AuxMClkEn, VbMClkEn, AspMClkEn, or RstMClkEn. When any one or more of those signals is present OR gate 60 provides an MCLKEN on line 36. If either that signal or the ASPORT interface signal on line 68 from DBB ASPORT interface 50 is present at OR gate 62, OR gate 62 will have an output to enable AND gate 64 to drive clock signal MCLK over line 32 to the circuits in ABB 14. In this way, clock signals are only provided when required by the circuits that are served by the clock signals themselves and there is no wasted power either in the presence of the clock signals on codec 14 or their transmission across the MCLK line 32.

Although specific features of the invention are shown in some drawings and not in others, this is for convenience only as each feature may be combined with any or all of the other features in accordance with the invention. The words "including", "comprising", "having", and "with" as used herein are to be interpreted broadly and comprehensively and are not limited to any physical interconnection. Moreover, any embodiments disclosed in the subject application are not to be taken as the only possible embodiments.

Other embodiments will occur to those skilled in the art and are within the following claims:

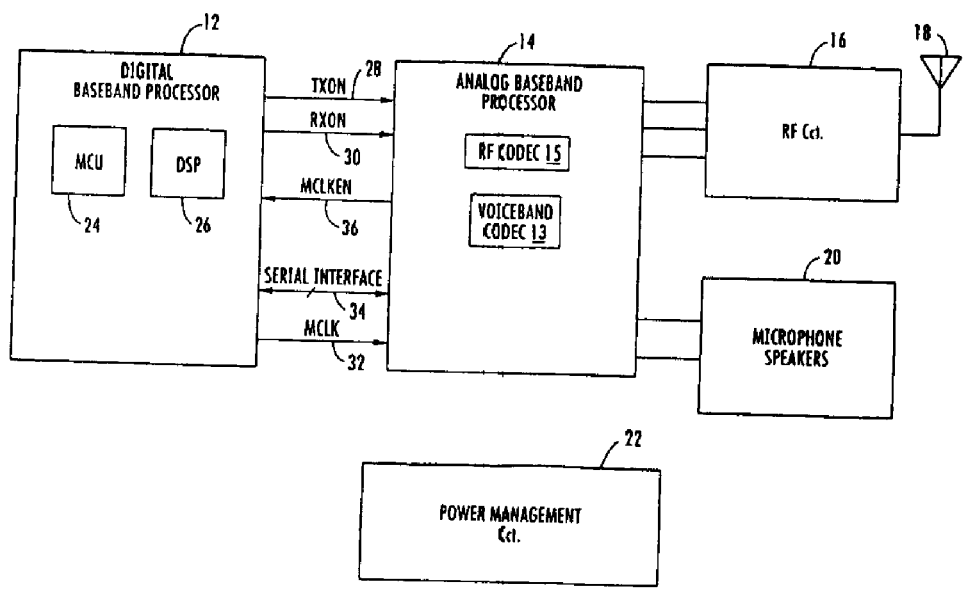

What is claimed is:

1. A clock enable system for a multichip device comprising:

a first integrated circuit including a clock signal and at least a second integrated circuit including at least one functional block requiring clock signals from the first integrated circuit;

a clock required circuit responsive to each said functional block for providing a clock required signal in response to activation of any one or more of said functional blocks; and a clock enable circuit responsive to said clock required signal for enabling the first integrated circuit to provide clock signals to said functional blocks on said second integrated circuit.

2. The clock enable system of claim 1 in which said clock required circuit is on said second integrated circuit.

3. The clock enable system of claim 1 in which said clock enable circuit is on said first integrated circuit.

4. A clock enable system for a multichip integrated circuit cellular terminal comprising:

a digital baseband processor integrated circuit including a clock signal and an analog baseband processor integrated circuit including at least one functional block requiring clock signals from said digital baseband processor integrated circuit;

a clock required circuit responsive to each said functional block for providing a clock required signal in response to activation of any one or more of said functional blocks; and a clock enable circuit responsive to said clock required signal for enabling the digital baseband processor integrated circuit to provide clock signals to said functional blocks on said analog baseband integrated circuit.

5. The clock enable system of claim 4 in which said clock required circuit is on said analog baseband integrated circuit.

6. The clock enable system of claim 4 in which said clock enable circuit is on said digital baseband processor integrated circuit.

7. The clock enable system of claim 4 in which said analog baseband integrated circuit includes an RF coder/decoder and a voiceband coder/decoder.

* * * * *

UNITED STATES PATENT AND TRADEMARK OFFICE
CERTIFICATE OF CORRECTION

PATENT NO. : 6,950,672 B2
DATED : September 27, 2005
INVENTOR(S) : Gealow et al.

It is certified that error appears in the above-identified patent and that said Letters Patent is hereby corrected as shown below:

The title page should be deleted to appear as per attached title page.

The sheet of drawings consisting of figures 1 and 2 should be deleted to appear as per attached figures.

Signed and Sealed this

Sixth Day of June, 2006

JON W. DUDAS
*Director of the United States Patent and Trademark Office*

(12) United States Patent
Gealow et al.

(10) Patent No.: US 6,950,672 B2
(45) Date of Patent: Sep. 27, 2005

(54) CLOCK ENABLE SYSTEM

(75) Inventors: Jeffrey C. Gealow, Andover, MA (US); Thomas J. Barber, Jr., Medford, MA (US); Palle Birk, Gistrup (DK); Joern Soerensen, Aars (DK)

(73) Assignee: Analog Devices, Inc., Norwood, MA (US)

(*) Notice: Subject to any disclaimer, the term of this patent is extended or adjusted under 35 U.S.C. 154(b) by 86 days.

(21) Appl. No.: 10/159,177

(22) Filed: May 30, 2002

(65) Prior Publication Data

US 2003/0224745 A1 Dec. 4, 2003

(51) Int. Cl.[7] ................................................ H04B 1/38
(52) U.S. Cl. ................. 455/550.1; 455/574; 327/291; 327/144
(58) Field of Search ........................... 455/181.1, 574, 455/343.4, 575.1, 183.2, 550.1, 407, 260, 334, 95, 127.1, 231, 556.1, 333, 265, 255, 343.1, 424, 425, 561, 456.5, 456.6; 713/500, 322, 300, 320, 324, 600, 501, 321; 375/316, 376, 219, 214; 327/99, 544, 398, 165, 211, 291, 295, 112, 415, 108, 213, 141, 144, 176, 233, 298; 326/93, 82, 83, 85, 21–28, 86, 87, 95

(56) References Cited

U.S. PATENT DOCUMENTS

| | | | | |
|---|---|---|---|---|
| 5,058,203 A | * | 10/1991 | Inagami | 455/89 |
| 5,485,127 A | * | 1/1996 | Bertoluzzi et al. | 331/69 |
| 5,675,808 A | | 10/1997 | Gulick et al. | |
| 5,677,849 A | * | 10/1997 | Smith | 713/300 |
| 5,950,120 A | * | 9/1999 | Gardner et al. | 455/343 |
| 6,125,451 A | * | 9/2000 | Fukunaga | 713/500 |
| 6,442,407 B1 | * | 8/2002 | Bauer et al. | 455/574 |
| 6,564,329 B1 | * | 5/2003 | Cheung et al. | 731/322 |
| 2003/0014682 A1 | * | 1/2003 | Schmidt | 713/500 |

* cited by examiner

Primary Examiner—Edward F. Urban
Assistant Examiner—Charles Chow
(74) Attorney, Agent, or Firm—Iandiorio & Teska

(57) ABSTRACT

A clock enable system for a multichip device includes a first integrated circuit including a clock signal and at least a second integrated circuit including at least one functional block periodically requiring clock signals from the first integrated circuit; a clock required circuit responsive to each functional block for providing a clock required signal in response to activation of any one or more of the functional blocks; and a clock enable circuit responsive to the clock required signal for enabling the first integrated circuit to provide clock signals to the functional blocks on the second integrated circuit.

7 Claims, 2 Drawing Sheets